United States Patent
Casati et al.

(10) Patent No.: US 7,822,658 B2
(45) Date of Patent: Oct. 26, 2010

(54) DYNAMIC PRIORITIZATION OF ACTIVITIES

(75) Inventors: Fabio Casati, Palo Alto, CA (US);
Ming-Chien Shan, Saratoga, CA (US);
Umeshwar Dayal, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2640 days.

(21) Appl. No.: 10/164,194

(22) Filed: Jun. 4, 2002

(65) Prior Publication Data

US 2003/0225644 A1 Dec. 4, 2003

(51) Int. Cl.
*G06Q 40/00* (2006.01)
(52) U.S. Cl. .............................. 705/35; 705/36; 705/39; 705/42; 705/44
(58) Field of Classification Search ............... 705/35–44
See application file for complete search history.

(56) References Cited

U.S. PATENT DOCUMENTS

| | | | | |
|---|---|---|---|---|
| 5,890,133 | A * | 3/1999 | Ernst ............................. | 705/7 |
| 5,907,831 | A | 5/1999 | Lotvin | |
| 5,946,662 | A * | 8/1999 | Ettl et al. ...................... | 705/8 |
| 5,956,693 | A | 9/1999 | Geerlings | |
| 5,974,396 | A | 10/1999 | Anderson | |
| 6,078,982 | A | 6/2000 | Du et al. | |
| 6,085,193 | A * | 7/2000 | Malkin et al. ................. | 707/10 |
| 6,115,693 | A | 9/2000 | McDonough | |
| 6,128,624 | A | 10/2000 | Papierniak | |
| 6,151,583 | A * | 11/2000 | Ohmura et al. ................ | 705/8 |
| 6,278,977 | B1 | 8/2001 | Agrawal | |
| 6,279,009 | B1 | 8/2001 | Smirnov | |
| 6,526,389 | B1 | 2/2003 | Murad | |
| 6,601,035 | B1 * | 7/2003 | Panagos et al. ................ | 705/8 |
| 6,606,740 | B1 | 8/2003 | Lynn | |
| 6,799,314 | B2 * | 9/2004 | Beniyama et al. ............ | 717/100 |
| 7,024,669 | B1 * | 4/2006 | Leymann et al. ............ | 718/100 |
| 7,346,532 | B2 * | 3/2008 | Kusama et al. ................ | 705/8 |
| 2001/0054032 | A1 | 12/2001 | Goldman | |
| 2002/0161823 | A1 * | 10/2002 | Casati et al. ................. | 709/202 |
| 2002/0174093 | A1 | 11/2002 | Casati | |
| 2003/0105658 | A1 | 6/2003 | Chen | |
| 2003/0167265 | A1 * | 9/2003 | Corynen ......................... | 707/4 |

OTHER PUBLICATIONS

Casati et al. "Adaptive and Dynamic Service Composition in eFlow", Hewlett-Packard Company, dated Mar. 2000.*

(Continued)

*Primary Examiner*—Ella Colbert
*Assistant Examiner*—Hai Tran

(57) ABSTRACT

A system comprises a first store of process instance data, a second store of data including predictions and statistics respectively corresponding to the process instance data, and a dynamic prioritization system configured to selectively access data in the first store and the second store and to estimate a cost of a process instance responsive to the accessing, wherein process instance node priorities are adjusted responsive to the estimate. A method comprises providing a first store of process instance data, providing a second store of data including predictions and statistics respectively corresponding to the process instance data, selectively accessing data in the first store and the second store, estimating a cost of a process instance responsive to the accessing and selectively adjusting process instance node priorities using a dynamic prioritization system responsive to the estimating.

24 Claims, 8 Drawing Sheets

OTHER PUBLICATIONS

Casati et al. "eFlow: a Platform for Developing and Managing Composite e-Services", Hewlett-Packard Companym dated Mar. 2000.*
Casati et al. "eFlow: a Platform for Developing and Managing Composite e-Services", Hewlett-Packard Company, HPL-2000-36, dated Mar. 2000.*
Casati et al., "eFlow: A Platform for Developing and Managing Composite E-Services", IEEE, Proceedings Academia/Industry Working Conference, pp. 341-348, dated Apr. 2000.*
U.S. Appl. No. 09/464,311, filed Dec. 15, 1999, Qiming Chen et al.
U.S. Appl. No. 09/860,230, filed May 18, 2001, Fabio Casati et al.

* cited by examiner

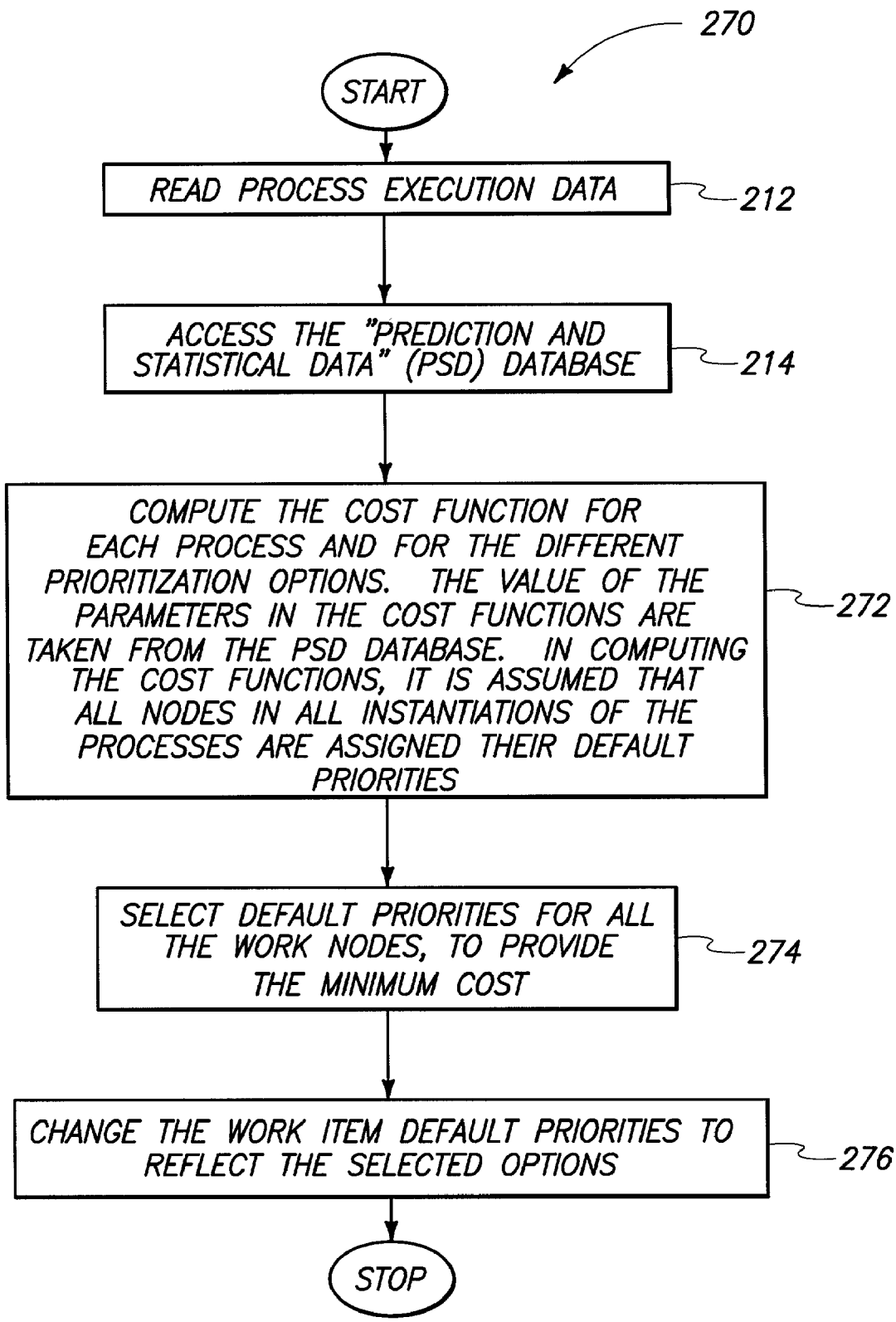

DYNAMIC PRIORITIZATION OF ACTIVITIES

FIELD OF THE INVENTION

The invention relates to workflow management and web service composition. More particularly, the invention relates to automated workflow analysis and prioritization.

BACKGROUND OF THE INVENTION

Many business-related processes depend upon the execution of pre-defined tasks. Computers and other automated systems are applied to automating a number of these pre-defined tasks, handling such aspects as: identification and allocation of resources; time management; inventory control; accounting procedures; etc. Systems dedicated to the definition, execution, management, and monitoring of such business processes are generally referred to as Process Management Systems (PMSs). When the process is used to compose (i.e., orchestrate the execution of) web services, then PMSs are also called "Service Composition Engines". The term PMS as used in this document refers to both systems executing business processes and to systems composing web services.

A process management system makes at least two determinations for each step in a business process: the services or specific procedures required; and the resources needed to perform them. Under this context, resources include, for example: personnel; office machinery; forms and other printed matter; computer hardware; software applications; third-party services (i.e., shipping contractor; technical consultant; etc.); consumables; etc.

Generally, a resource will be assigned to several pending activities, representing numerous different processes. For example, an administrative employee may have to process several travel reimbursement requests, to book hotels for visitors, arrange meetings, and so on. Thus, any given resource is likely to have involvement in several different tasks concurrently. Within current Process Management Systems, personnel can choose the order in which they process activities assigned to them, or, in the case of an automated resource, will perform the assigned tasks on a First Come, First Served (FCFS) basis.

The inherently arbitrary order in which personnel may choose to perform (or avoid) assigned tasks often leads to poorly prioritized execution of that task, sometimes to the extent that deadlines are missed, or unnecessary time and cost burdens are assumed in meeting the deadline. Such burdensome, "hurry-up" situations can also lead to sacrificing service quality or missing other deadlines, having a compounding effect on other assigned tasks. The first come, first served nature of automated systems can lead to similar inefficiencies and missed deadlines, for example, if several relatively low-priority tasks are completed before a longer-duration, relatively high-priority task, simply because of their order within the work queue.

Attention is directed to U.S. patent application Ser. No. 09/860,230, U.S. Patent Publication No. 2002/0174093, filed May 18, 2001, titled "Method of Identifying and Analyzing Business Processes from Workflow Audit Logs", listing as inventors Fabio Casati, Ming-Chien Shan, Li-Jie Jin, Umeshwar Dayal, Daniela Grigori, and Angela Bonifati, which describes workflow management systems and workflow audit logs, and which is incorporated herein by reference. Attention is also directed to U.S. patent application Ser. No. 09/464,311, U.S. Patent Publication No. 2003/0105658, filed Dec. 15, 1999, titled "Custom Profiling Apparatus for Conducting Customer Behavior Pattern Analysis, and Method for Comparing Customer Behavior Patterns", naming Qiming Chen, Umeshwar Dayal, and Meichun Hsu as inventors, and which is incorporated herein by reference.

SUMMARY OF THE INVENTION

The invention relates to a system and method for automatically assigning and dynamically modifying priorities of the work items (i.e., nodes) in order to optimize process execution performance.

One aspect of the invention provides a system for estimating a cost of a process, the system comprising a first store of process instance data, a second store of data including predictions and statistics respectively corresponding to the process instance data, and a dynamic prioritization system configured to selectively access data in the first store and the second store and to estimate a cost of a process instance responsive to the accessing.

Another aspect of the invention provides a method of estimating a cost of a process, the method comprising a first store of process instance data, providing a second store of data including predictions and statistics respectively corresponding to the process instance data, selectively accessing data in the first store and the second store, and estimating a cost of a process instance responsive to the accessing using a dynamic prioritization system.

Another aspect of the invention provides a system comprising means for selectively accessing data related to a process, means for accessing predictions and statistics data related to the process, means for computing a cost of a step within the process responsive to the accessing, and means for selectively prioritizing the step responsive to the computing.

DESCRIPTION OF THE DRAWINGS

FIG. 8 is a flowchart of the steps executed by yet another embodiment of the invention.

DETAILED DESCRIPTION OF THE INVENTION

Figure 1:
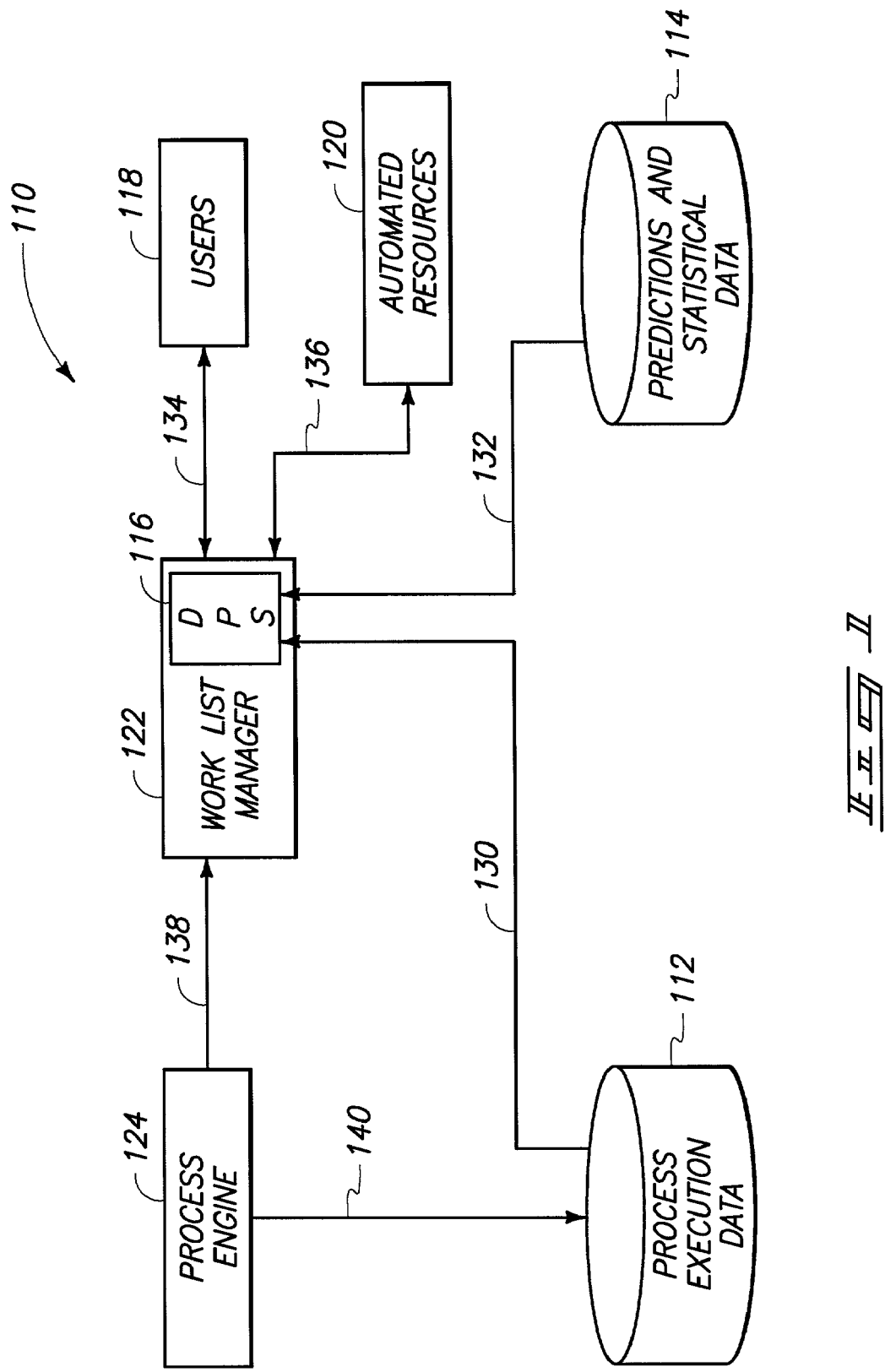
FIG. 1 provides a block diagrammatic illustration of a business system according to one embodiment of the invention.

FIG. 1 provides a block diagram of a system 110 according to one embodiment of the invention. The system 110 includes a store of process execution data (i.e., process instance data) 112. In one embodiment, the store 112 is defined by a memory such as a floppy disk, a hard drive, an optical disk, a digital tape, a ROM, a RAM, or any other type of storage device used by computers or digital equipment. The process data is generated by a process engine 124 configured to gather and store process instance data as process execution progresses. The process instance data within the store 112 can include, for example: overall process definitions; specific sub-steps, or 'nodes' within a defined process; process instance input parameters; process instance output parameters; process instance activation and completion time(s); process instance priority; and input and output parameters, activation and completion time(s) and priorities for each node within a process instance.

The system 110 further includes a store of predictions and statistical data 114. The prediction and statistical data within the store 114 includes statistical aggregation data, such as, for example: average execution time for each type of process instance and node; total execution times for each type of process instance and node; average number of times a certain node is invoked within a certain process instance; etc. The prediction data within the store 114 includes, for example: data predicting the next node to be executed; data predicting the time required to execute the node; data predicting the time and date a given process instance will be complete; etc.

In the illustrated embodiment, a dynamic prioritization system 116 is integrated within a worklist manager 122. The worklist manager 122 stores a listing of tasks or process instances which are pending. The dynamic prioritization system 116 is in data communication with the data store 112 and the data store 114 by way of data links 130 and 132, respectively. The dynamic prioritization system 116 functions to keep the list of process instances in worklist manager 122 in priority order to ensure the proper sequence of execution by their corresponding resources (described hereafter).

The process engine 124 is further configured to read data from, write data to, and exercise control of worklist manager 122 and data store 112. In one embodiment, a processor is included which executes the functions of, dynamic prioritization system 116, worklist manager 122, and process engine 124. Other embodiments are possible. Furthermore, system 110 includes user interfaces 118 and automated resources 120, which request work task information (i.e., assigned process instances) from the dynamic prioritization system 116 by way of respective data links 134 and 136.

Figure 6:
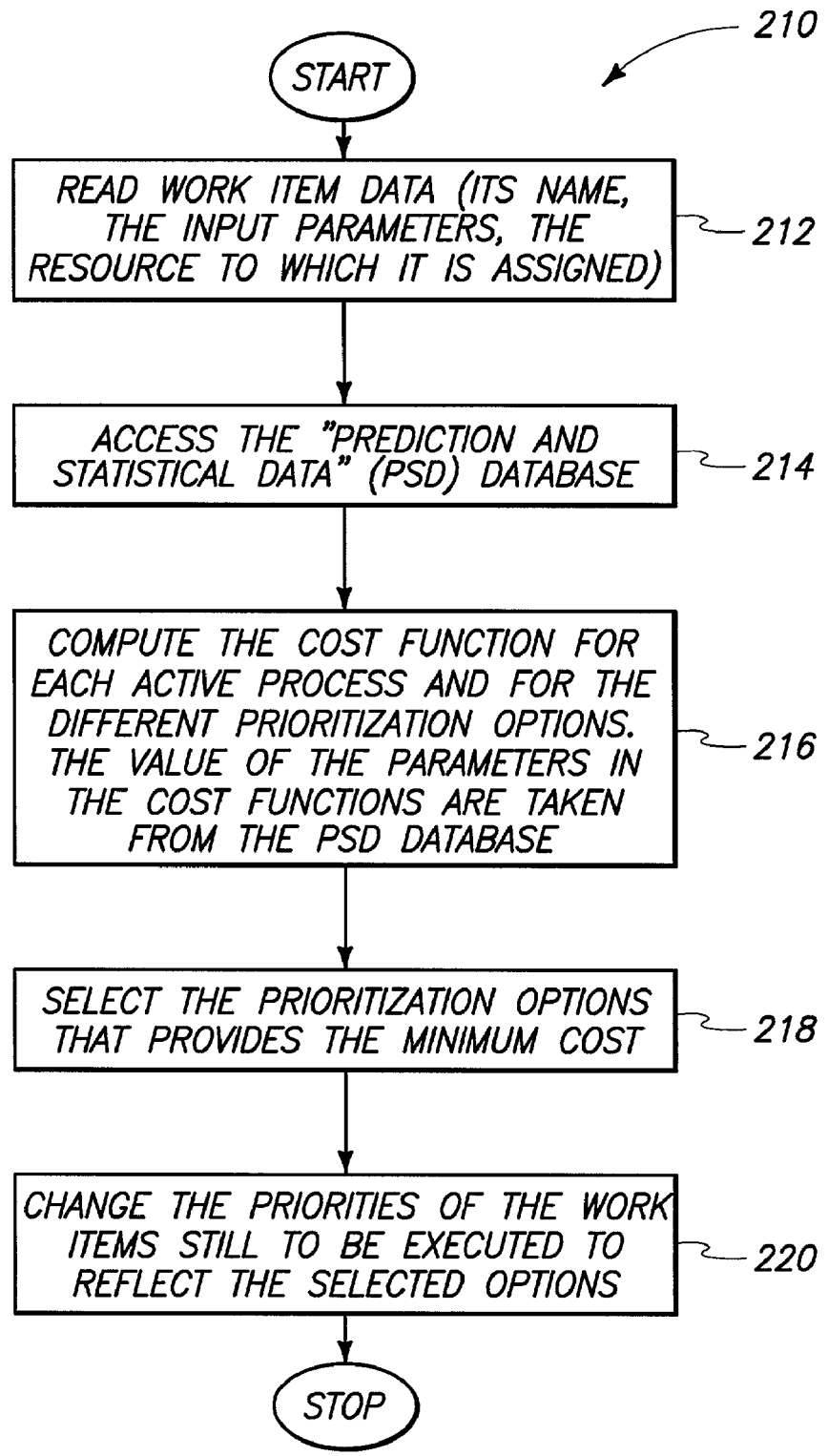
FIG. 6 is a flowchart of the steps executed by some embodiments of the invention.

FIG. 6 provides a sequence flowchart of the operations performed by dynamic prioritization system 116, generally referred to as numeral 210. The sequence 210 is executed each time any node of a process instance is scheduled for execution.

The sequence 210 begins with step 212, in which the dynamic prioritization system 116 determines which process instances within the worklist manager 122 are active (i.e., in progress), and are therefore in need of analysis. Corresponding data is then gathered from store 112 by dynamic prioritization system 116.

In step 214, the dynamic prioritization system 116 gathers corresponding prediction and statistical data from store 114.

In step 216, the dynamic prioritization system 116 computes the cost of executing the process instance that is under analysis. The cost of executing a given process instance is determined by way of a 'cost function' f1, which is a multi-variable function defined as follows:

$$C=Fpd(t, Vn) \; f1$$

where: C denotes the computed cost; pd denotes the specific process definition; t denotes the time; and Vn denotes the process instance execution trace.

The specific values for the parameters in cost function Fpd are taken from the predictions and statistical database store 114. Particular attributes and characteristics of cost function Fpd( ) shall be subsequently described. Continuing the description of step 216, the dynamic prioritization system 116 computes the predicted value of C for each possible (i.e., defined) prioritization option of the process instance. Steps 212, 214 and 216 are performed in an iterative fashion until all active process instances have been cost analyzed.

In step 218, the dynamic prioritization system 116 selects that combination of prioritization options that provides the minimum cost of performing the active process instances.

In step 220, the dynamic prioritization system 116 alters the order of the analyzed process instances (i.e., those in progress or still awaiting execution) presently queued within worklist manager 122 corresponding to the priorities selected in step 218. In this way, user interfaces 118 and automated resources 120 receive the most recently prioritized tasks (i.e., nodes) within a given process instance in response to an assignment request to worklist manager 122 by way of respective links 134 and 136. This manner of requesting process instance node assignments on an "at-will" basis is known as a 'pull' model.

Figure 2:
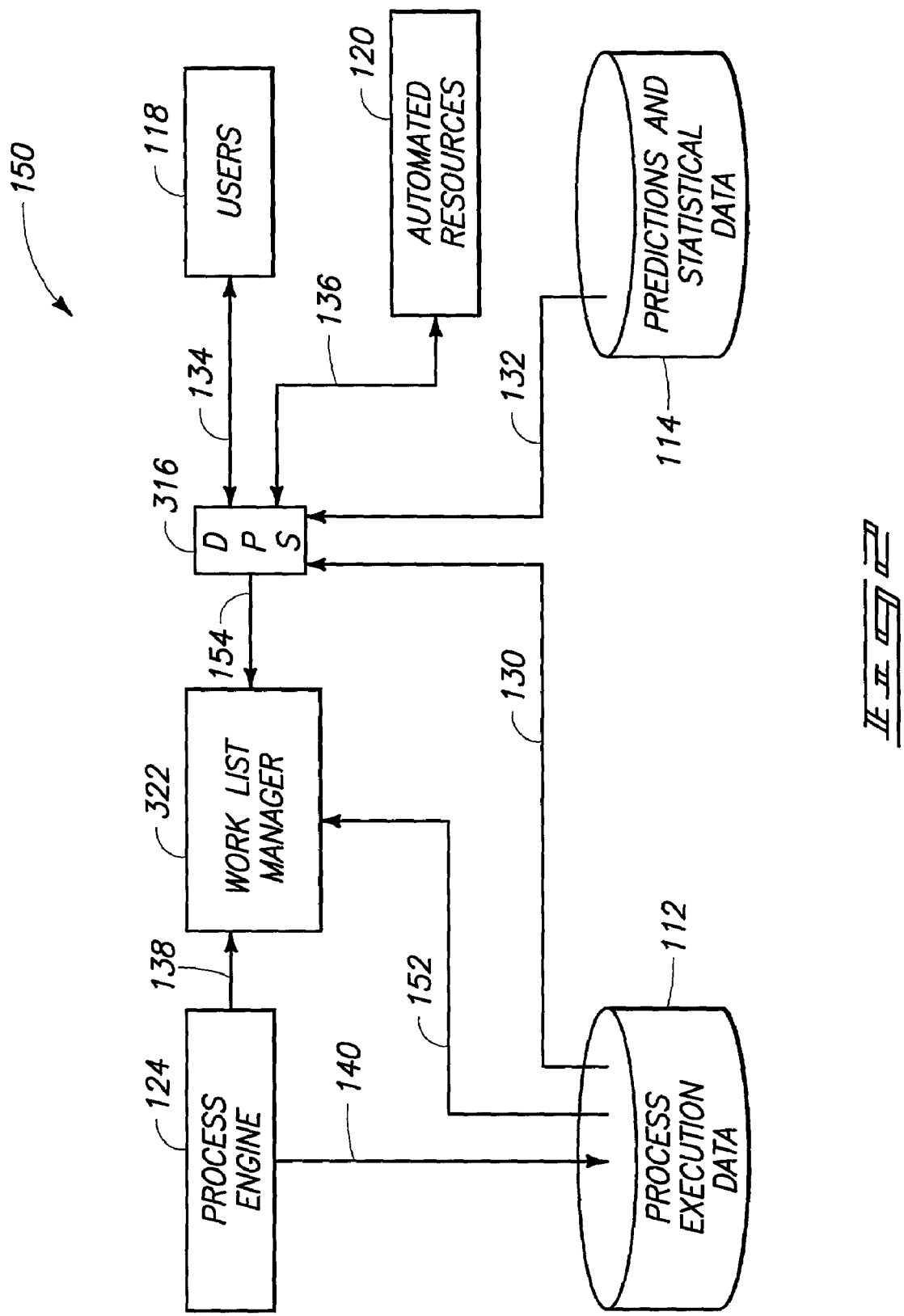
FIG. 2 provides a block diagrammatic illustration of a business system according to another embodiment of the invention.

Referring to FIG. 2, a system 150 according to another embodiment of the invention is shown in block diagrammatic form. The system 150 is substantially the same as system 110, with like reference numbers indicating like components, except that the dynamic prioritization system 316 is remote from worklist manager 322, having data communication therebetween by way of link 154. In addition, the process execution data store 112 is in data communication with the worklist manager 168. In one embodiment, a processor executes the functions of the process engine 124, the dynamic prioritization system 316, and the work list manager 322. Other embodiments are possible.

The system 150 is governed substantially by sequence 210 as previously described, with the principal difference occurring at step 220. Rather than altering the order of the process instances queued within worklist manager, the dynamic prioritization system 316 simply passes the highest priority nodes within pending process instances to user interfaces 118 and automated resources 120 in response to corresponding assignment requests. In this way, the dynamic prioritization system 166 acts as the 'front end' of system 150 as seen by user interfaces 118 and automated resources 120. This prevents the need to reorder the process instance queue within worklist manager 322. The system 150 is another embodiment of a pull model.

Figure 3:
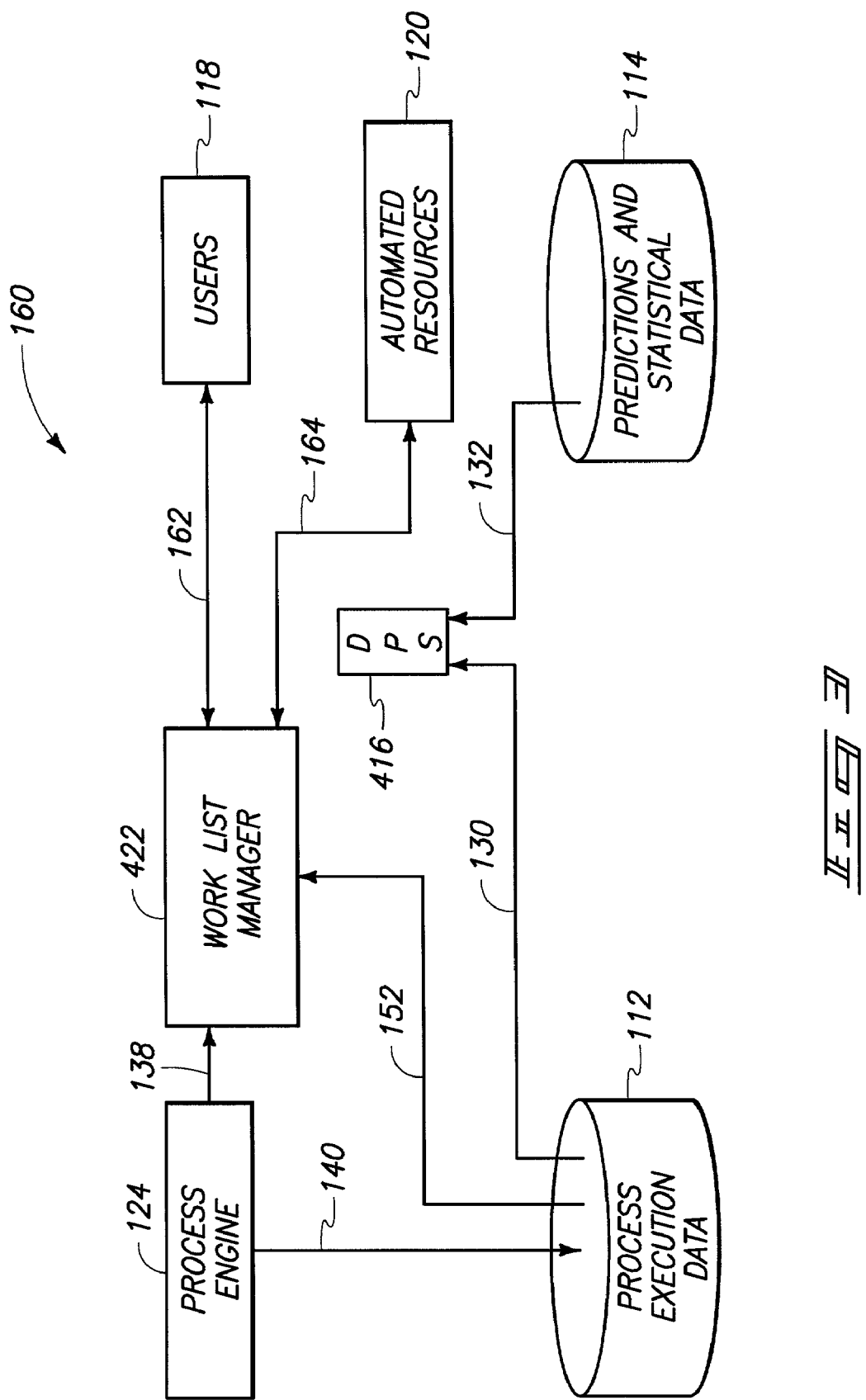
FIG. 3 provides a block diagrammatic illustration of a business system according to still another embodiment of the invention.

Turning now to FIG. 3, a system 160 according to still another embodiment of the invention is provided in block diagrammatic form. The system 160 is substantially the same as the system 150, with the distinction that the dynamic prioritization system 416 is remote from the worklist manager 422, having no direct data communication link therebetween. The system 160 is governed substantially by the sequence 210 as previously described, with the difference being that sequence 210 is executed periodically, rather than in response to node execution scheduling.

Process instances queued in the worklist 422 are reordered in step 220 by the dynamic prioritization system 416 in correspondence to the priorities selected in step 218 after each execution of sequence 210. Furthermore, user interfaces 118 and automated resources 120 request assignments directly from worklist 422 by way of respective links 162 and 164. The system 160 is another embodiment of a pull model. In one embodiment, a processor executes the functions of the process engine 124, the dynamic prioritization system 416, and the work list manager 422. Other embodiments are possible.

Figure 4:
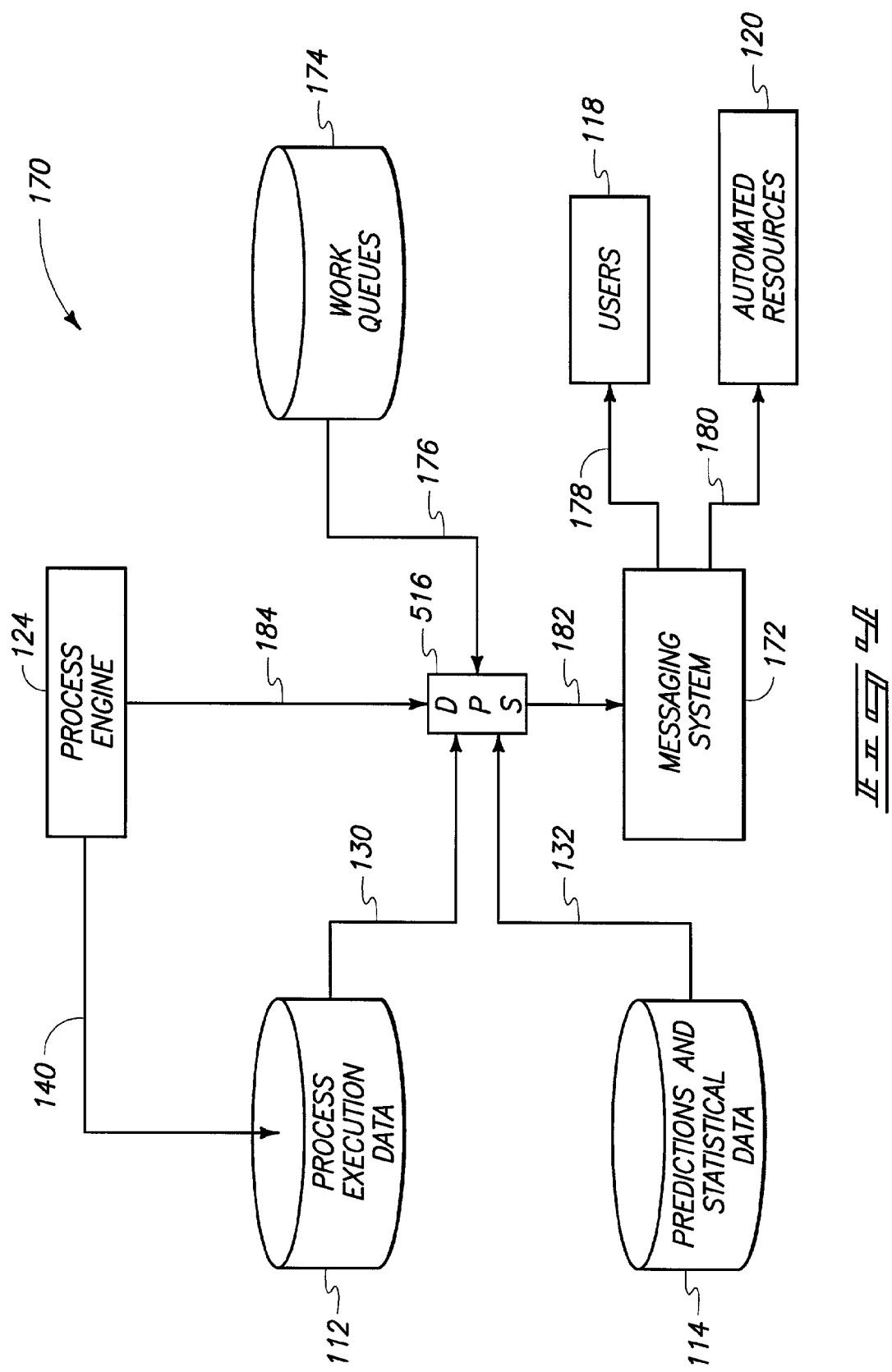
FIG. 4 provides a block diagrammatic illustration of a business system according to yet another embodiment of the invention.

FIG. 4 provides a block diagram of a system 170 according to another embodiment of the invention. The system 170 includes previously described elements 112, 114, 118, 120 and 124. Further included in the system 170 are messaging system 172 and work queues 174, as well as dynamic prioritization system 516. The pending process instances are queued within work queues 174, rather than within a worklist manager (not used in system 170), as before. In one embodiment, a processor executes the functions of the process engine 124, the messaging system 172, and the dynamic prioritization system 516. Other embodiments are possible.

Figure 7:
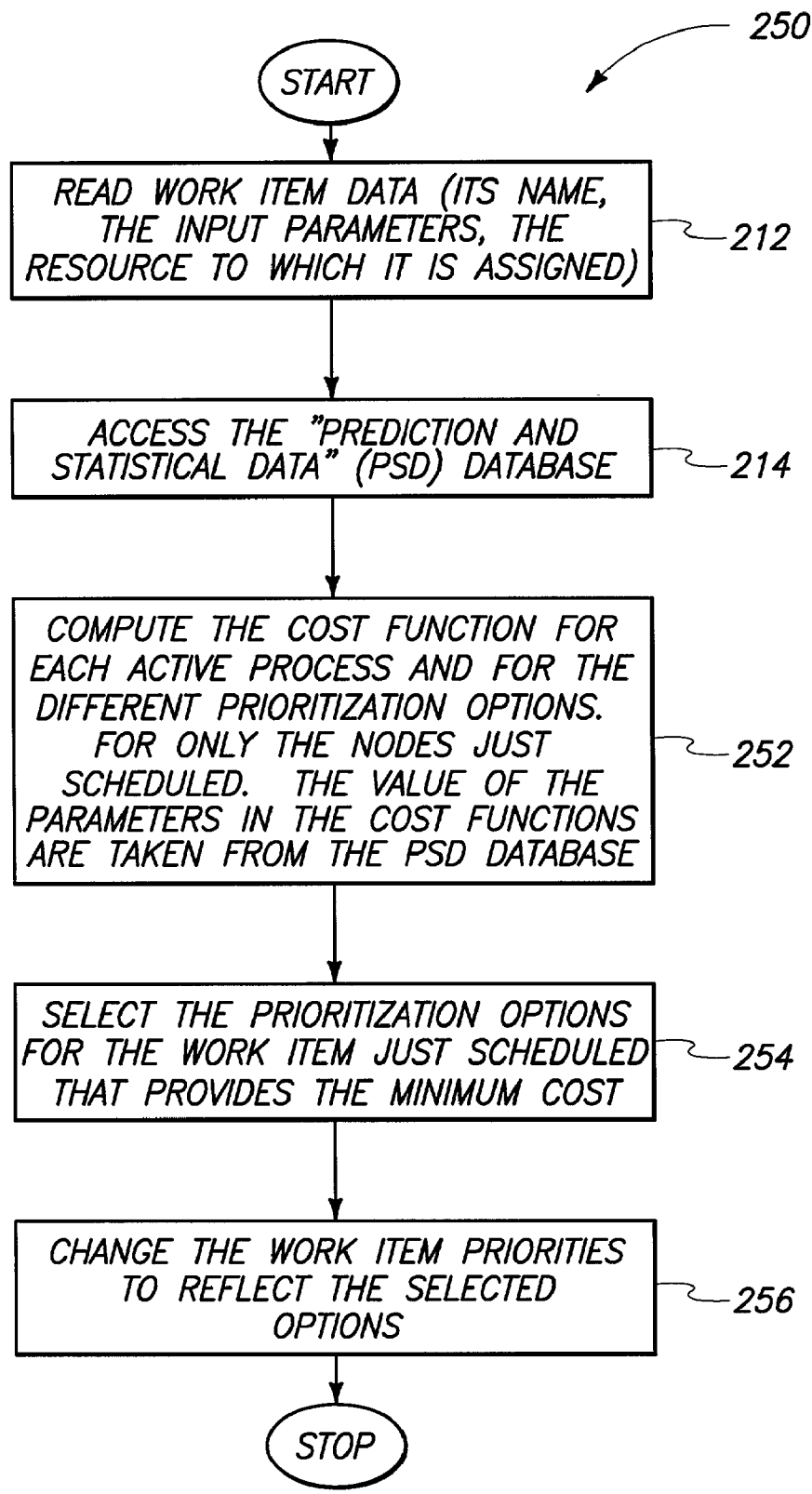
FIG. 7 is a flowchart of the steps executed by another embodiment of the invention.

Concurrent reference is now made to FIGS. 4 and 7. FIG. 7 provides a sequence flowchart of the operations performed by dynamic prioritization system 516, generally referred to as numeral 250.

The sequence 250 is executed each time a node in a process instance is scheduled for execution, and begins with sequential steps 212 and 214, as previously described.

In step 252, the dynamic prioritization system 516 calculates the cost of executing each just-scheduled node using the cost function corresponding to each, with the dynamic prioritization system 516 reading the required parameters from the process execution data store 112.

In step 254, the dynamic prioritization system 516 selects the prioritization options for each node just scheduled that results in the minimum overall cost of execution.

In step 256, the process instances of work queues 174 are reordered in correspondence with the prioritization options selected in step 254.

In further consideration of the system 170, the dynamic prioritization system 516 communicates newly prioritized (i.e., scheduled) nodes to messaging system 172, by way of communications link 182. The messaging system 172 is configured to route nodes to their assigned destinations—users 118 or automated resources 120—by way of respective data links 178 and 180. This routing is automatic in response to receiving nodes from the dynamic prioritization system 516, and is not responsive to a request from user interfaces 118 or automated resources 120. This scheme is therefore known as a 'push' model, as assigned nodes are pushed to their respective assignees rather than being passed upon request.

Figure 5:
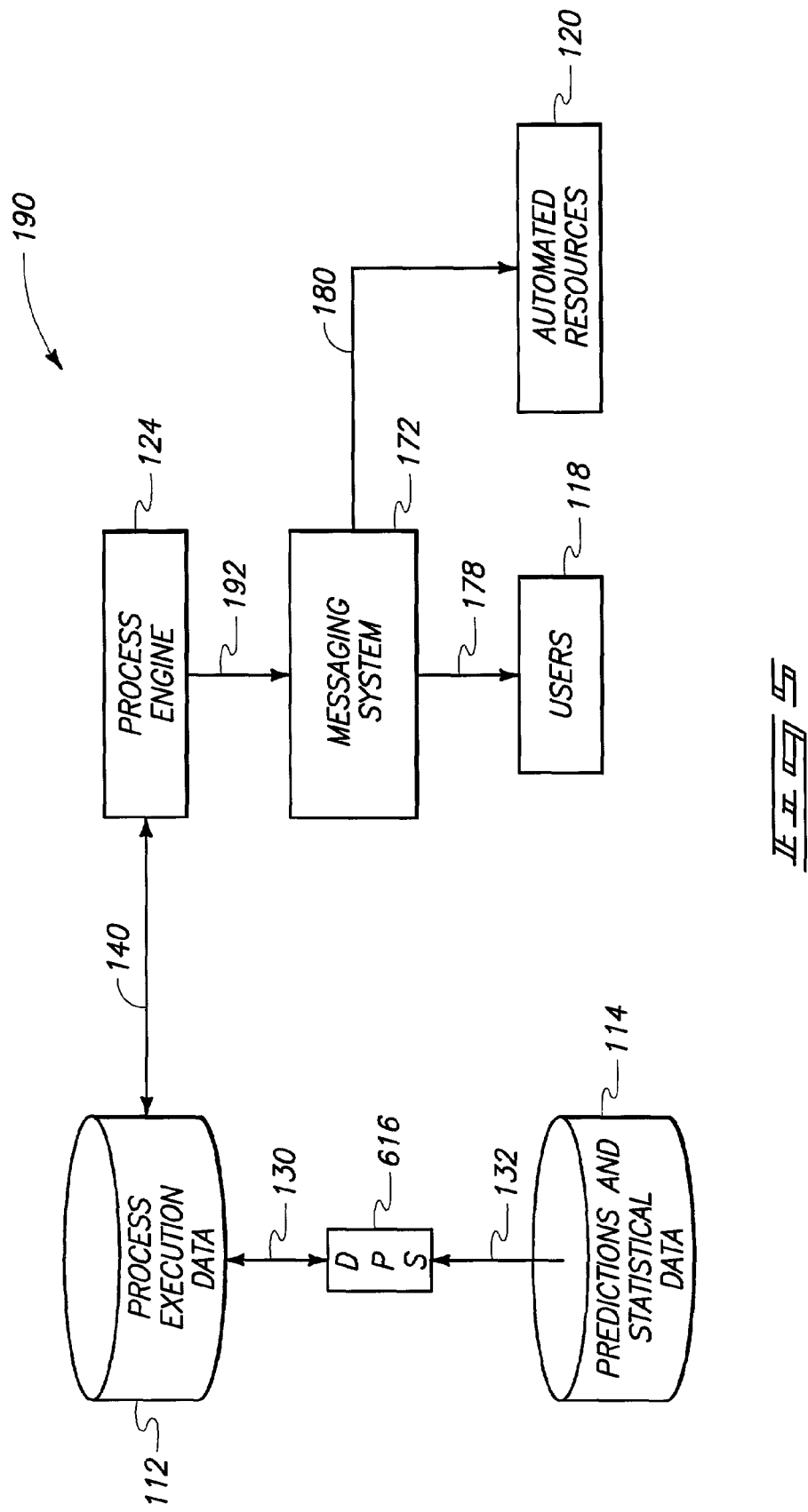
FIG. 5 provides a block diagrammatic illustration of a business system according to another embodiment of the invention.

FIG. 5 is a block diagram of a business system according to another embodiment of the invention, generally referred to as numeral 190. The system 190 includes previously described elements 112, 114, 118, 120, 124, and 172. Further included is a dynamic processing system 616. The system 190 does not include a worklist manager, as the dynamic prioritization system 616 pushes assigned nodes to corresponding user interfaces 118 and automated resources 120 upon scheduling; thus, no worklist manager is required as user interfaces 118 and automated resources 120 do not request assignments. In one embodiment, a processor executes the functions of the process engine 124, the messaging system 172, and the dynamic prioritization system 616. Other embodiments are possible.

Concurrent reference is now made to FIGS. 5 and 8. FIG. 8 is a flowchart of the operations performed by the dynamic prioritization system 616, with the sequence generally referred to as numeral 270.

The sequence 270 begins with the sequential execution of steps 212 and 214, which perform as previously described.

In step 272, the dynamic prioritization system 616 computes the cost of executing each process instance, for each respective prioritization option. As before, the parameters required for the cost computation are taken from the data store 114, by way of data communications link 132. In computing the costs, the dynamic prioritization system 616 assumes that all process instances are assigned their default priorities.

In step 274, the dynamic prioritization system 616 selects the default priorities for all work nodes that provide the minimum cost of execution for each active process instance.

In step 276, the dynamic prioritization system 616 alters the default priorities of each work item (i.e., node) to reflect the minimum-cost selections of step 274. The dynamic prioritization system 616 then stores the selected nodes in data store 112, where they are read by the process engine 124 by way of data link 140. The process engine 124 then sends the selected node to messaging system 172 by way of path 192, which in turn pushes (i.e., transmits) them to corresponding user interfaces 118 and automated resources 120 by way of respective links 178 and 180. System 190 is selectively executed each time a node is completed, each time a node is scheduled, or periodically, as desired by a system administrator.

In addition to the systems and sequences just described, various embodiments provide for a number of work prioritization schemes, which contribute to identifying the appropriate priority order to optimize overall process instance performance. These include, for example:

a1) Prediction of work item execution time, which refers to the prediction of execution time for a work item by the resource to which it is assigned, also depending on the process instance, the time in which the work item is executed, and other parameters.

a2) Prediction of process execution time, which is the prediction of the remainder of the process instance, selectively based on a given priority assignment.

a3) Prediction of the process load, which is the prediction of how many process instances will be activated a4) Prediction of process instance execution path, which predicts the flow subgraphs required by a process instance, and specifically predictions of which nodes will be activated, and when, and how many times.

a5) Prediction of resource load, which is the prediction of how many work items will be assigned to a given resource at a future time.

Through the use of schemes a1, a2, a3, a4 and a5, the predictions process is dynamic and ongoing, taking into account both past process execution predictions as well as actual process instance performance, so that the business system of the present invention is adaptive in nature. Once the above variables have been predicted, then the DPS can compute the cost function using these predicted values. The cost function is used when evaluating the different prioritization schemes.

The protection sought is not to be limited to the disclosed embodiments, which are given by way of example only, but instead is to be limited only by the scope of the appended claims.

What is claimed is:

1. A system comprising:
   a processor;
   a first store of process instance data, including process definitions of corresponding process instances and identification of nodes within the process instances;
   a second store of data including prediction data and statistics data respectively corresponding to the process instance data, wherein the prediction data is selected from the group consisting of: data indicating amounts of time predicted to execute the corresponding process instances, and data indicating amounts of time predicted to execute corresponding nodes in the process instances; and
   a dynamic prioritization system executable on the processor and configured to access data in the first store and the second store and to dynamically prioritize order of execution of at least one of: (1) pending process instances and (2) nodes within the pending process instances, responsive to accessing the data in the first store and second store.

2. A system in accordance with claim 1, further comprising a worklist manager having a queue that stores the pending process instances in an ordered priority sequence of execution by corresponding resources, wherein the ordered priority sequence is according to the dynamic prioritization determined by the dynamic prioritization system.

3. A system in accordance with claim 2, wherein the dynamic prioritization system is further configured to estimate costs of the pending process instances based on at least one of the process instance data in the first store and the prediction data and statistics data in the second store.

4. A system in accordance with claim 3, wherein the dynamic prioritization determined by the dynamic prioritization system is based on the costs estimated for said pending process instances.

5. A system in accordance with claim 1, wherein the prediction data in the second store includes data predicting a next node to be executed in a particular one of the process instances.

6. A system in accordance with claim 1, wherein the statistics data in the second store includes one or more of: average execution time for a first type of process instance; average execution time for a first type of node; total execution time for a second type of process instance; and total execution time for a second type of node.

7. A system in accordance with claim 1, wherein the process instance data includes at least one of: process instance input parameters and process instance output parameters.

8. A system in accordance with claim 1, wherein the prediction data in the second store further includes a prediction of an execution path of a particular pending process instance.

9. A system in accordance with claim 1, wherein the prediction data in the second store further includes one or more of: a prediction of how many process instances will be activated, and a prediction of how many work items will be assigned to a given resource at a future time.

10. A system in accordance with claim 1, wherein the dynamic prioritization system is configured to provide the highest priority nodes within the pending process instances to corresponding resources.

11. A method comprising:
providing a first store of process instance data, including process definitions of corresponding process instances and identification of nodes within the process instances;
providing a second store of data including prediction data and statistics data corresponding to the process instance data, wherein the prediction data is selected from the group consisting of: data indicating amounts of time predicted to execute the corresponding process instances, and data indicating amounts of time predicted to execute corresponding nodes in the process instances;
accessing the process instance data in the first store and the prediction data and statistics data in the second store; and
dynamically prioritizing order of execution of at least one of: (1) pending process instances and (2) nodes within the pending process instances, using a dynamic prioritization system executed by a processor, based on the data that was accessed from the first store and the second store.

12. A method in accordance with claim 11, further comprising storing a queue that includes pending steps of the pending process instances in an ordered priority sequence of execution that is according to the dynamic prioritization determined by the dynamic prioritization system.

13. A method in accordance with claim 12, further comprising estimating, by the dynamic prioritization system, costs of the pending steps of the pending process instances based on at least one of the process instance data in the first store and the prediction data and statistics data in the second store.

14. A method in accordance with claim 13, further comprising selectively varying, by the dynamic prioritization system, the ordered priority sequence of execution of a plurality of the pending steps of the pending process instances based on the estimating.

15. A method in accordance with claim 14, further comprising selectively passing at least a portion of a particular pending process instance to a resource responsive to a request based on the ordered priority sequence of execution.

16. A method in accordance with claim 14, further comprising selectively passing, by the dynamic prioritization system, at least a portion of the pending process instance having highest priority in the ordered priority sequence of execution to a resource, responsive to a request.

17. A method in accordance with claim 11, wherein the prediction data in the second store further includes a prediction of an execution path of a particular pending process instance.

18. A method in accordance with claim 11, wherein the prediction data in the second store further includes one or more of: a prediction of how many process instances will be activated, and a prediction of how many work items will be assigned to a given resource at a future time.

19. A method in accordance with claim 11, wherein the dynamic prioritization system provides the highest priority nodes within the pending process instances to applicable resources.

20. A system, comprising:
a first store of data related to execution of a process;
a second store of prediction data and statistics data related to execution of the process, wherein the prediction data is selected from the group consisting of: data indicating an amount of time predicted to execute the process, and data indicating amounts of time predicted to execute corresponding steps in the process;
a processor configured to:
compute a cost of a particular step within the process based on the prediction data and the statistics data accessed; and
selectively prioritize an order of executing the particular step based on the cost computed.

21. A system in accordance with claim 20, further comprising a queue to store a plurality of processes, each of the plurality of processes having at least one step, wherein the processor is configured to selectively compute a cost for the at least one step of each of the plurality of processes.

22. A system in accordance with claim 21, wherein the selectively prioritization is performed by selectively prioritizing the order of executing the at least one step of each of the plurality of processes based on the costs of the corresponding steps of the plurality of processes.

23. A system in accordance with claim 22, wherein the processor is configured to further selectively provide at least one step to a resource responsive to a request in accordance with the prioritization of the order of executing the steps.

24. A system in accordance with claim 22, wherein the processor is configured to further selectively push at least one step to a resource responsive to a schedule in accordance with the prioritization of the order of executing the steps.

* * * * *